United States Patent [19]

Appel et al.

[11] 4,236,410
[45] Dec. 2, 1980

[54] TEMPERATURE-COMPENSATED ELECTROMAGNETIC FLOWMETER

[75] Inventors: Eggert Appel, Dransfeld; Gottfried Geisler, Göttingen; Wilfried Kiene, Hann Munden; Peter Nissen, Rosdorf, all of Fed. Rep. of Germany

[73] Assignee: Fischer & Porter Co., Warminster, Pa.

[21] Appl. No.: 956,896

[22] Filed: Nov. 2, 1978

[30] Foreign Application Priority Data

Dec. 20, 1977 [DE] Fed. Rep. of Germany ....... 2756873

[51] Int. Cl.³ .............................................. G01F 1/60
[52] U.S. Cl. ................................. 73/861.12; 361/140
[58] Field of Search .................. 73/194 EM; 361/140; 324/225; 335/217

[56] References Cited

U.S. PATENT DOCUMENTS

| | | | |
|---|---|---|---|
| 2,898,524 | 8/1959 | Stamberger | 361/140 X |
| 3,380,301 | 4/1968 | Mannherz et al. | 73/194 EM |
| 3,573,525 | 4/1971 | Fuse | 335/217 X |
| 4,033,830 | 7/1977 | Fletcher | 73/194 EM |

FOREIGN PATENT DOCUMENTS 158691 9/1963 U.S.S.R. ............................. 73/194 EM

Primary Examiner—Charles A. Ruehl
Attorney, Agent, or Firm—Michael Ebert

[57] ABSTRACT

An electromagnetic flowmeter in which the fluid to be metered is conducted through a flow tube provided with a pair of diametrically-opposed electrodes. The fluid intercepts a magnetic field established in the flow tube by a magnetizable core having a coil wound thereon through which an excitation current flows, thereby inducing a signal voltage in the electrodes. Because the permeability of the core is temperature-dependent, changes in temperature affect the strength of the magnetic field and adversely influence the signal voltage. Compensation means are provided to render the signal voltage independent of temperature, thereby producing an output signal accurately proportional to flow rate.

2 Claims, 4 Drawing Figures

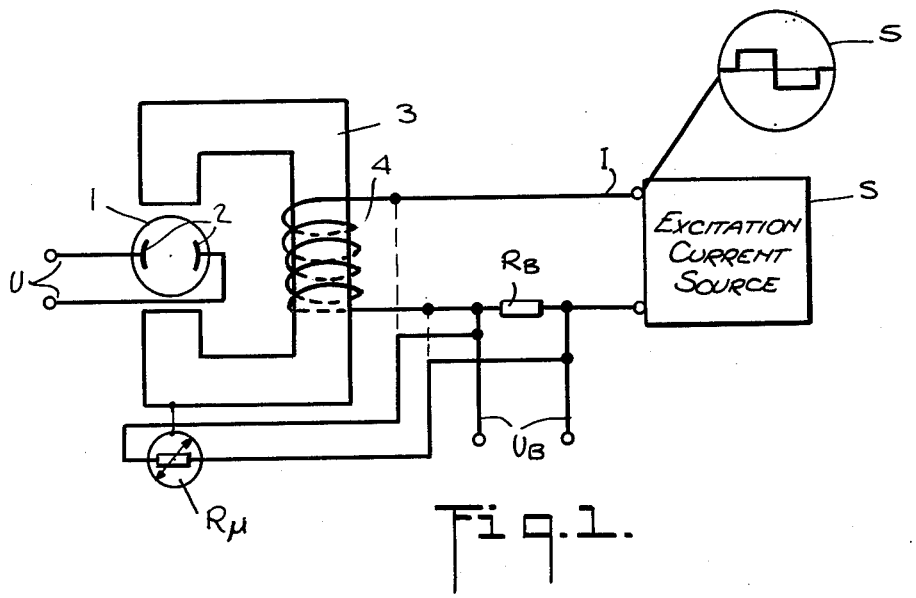
Fig. 1.
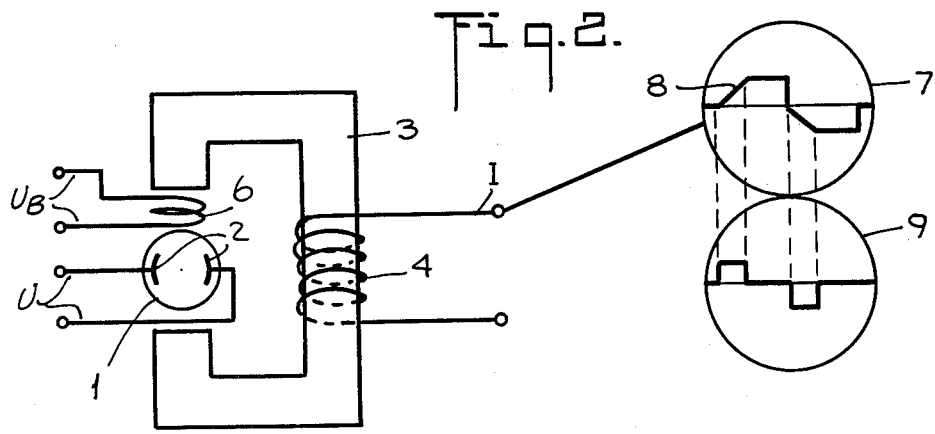
Fig. 2.
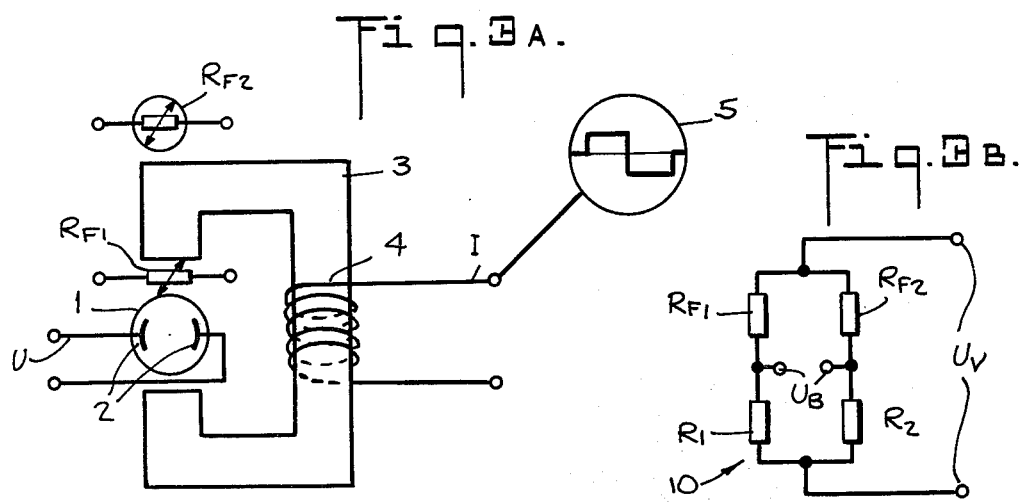
Fig. 3A.
Fig. 3B.

TEMPERATURE-COMPENSATED ELECTROMAGNETIC FLOWMETER

BACKGROUND OF INVENTION

This invention relates generally to an electromagnetic flowmeter having an electromagnet provided with a magnetizable core whose permability is temperature-dependent, and more particularly to a circuit arrangement compensating for the effect of temperature on the output signal yielded by the flowmeter.

In an electromagnetic flowmeter, an electromagnetic field is established therein by an electromagnet having an excitation coil wound on a magnetizable core, the field being intercepted by a fluid passing through the flow tube to induce a voltage in a pair of electrodes mounted at diametrically-opposed positions of the tube.

Electromagnetic flowmeters are known which make use of low-frequency, uni-polarity or alternating polarity excitation current pulses. One can, by means of a low-frequency excitation type magnetic flowmeter obtain a flow rate signal having an excellent signal-to-noise ratio; for unwanted magnetic and electrostatic couplings between the excitation coil and the signal lead wires connected to the flow tube electrodes may be substantially reduced by low-frequency excitation of the coil.

The voltage derived from the electrodes of the flowmeter is applied to a measuring circuit to produce a signal voltage U that depends on the strength of the magnetic field B and varies in accordance with the flow rate of the fluid being metered. In order to render signal voltage U accurately proportional to flow rate, one must either maintain the strength of the magnetic field constant, or one must compensate signal voltage U for variations in the strength of the magnetic field.

In order to eliminate unwanted fluctuations from the flow rate signal voltage yielded by a magnetic flowmeter which result from fluctuations in the excitation current, the general practice is to provide a reference voltage-detecting circuit. This circuit is arranged to produce a reference voltage proportional to the excitation current, the ratio of this reference voltage to the flow rate signal voltage being determined by means of a converter or divider. To produce the reference voltage, it is known to interpose a resistor in the excitation circuit, the voltage drop across the resistor being proportional to the excitation current and therefore reflecting fluctuations in this current.

In prior attempts to maintain constant the strength of the magnetic field, use was made of a measuring coil interposed in the field to produce a measuring voltage dependent on field strength, which voltage could be used to correct for variations in strength. But where the excitation current for producing the magnetic field is constituted by square-wave direct-current pulses, then at points coincident with the vertical leading edges of the pulses, voltage surges or spikes are induced in this measuring coil that do not reflect the strength of the magnetic field.

While other expedients have also been used to maintain constant the strength of the magnetic field as by regulating the intensity of the excitation current pulses, it has heretofore not been possible to achieve the desired result, which is to provide an output signal that accurately reflects the flow rate of the fluid being metered.

It has been discovered that the reason why prior efforts have failed to fully correct for deviations in the output signal from a proportional relationship with flow rate is that they did not take into account the effect of temperature on magnetization. This effect stems from the temperature-dependent permeability characteristics of the magnetizable core. While the relationship between the permeability of a magnetizable material and temperature is generally known, consideration has heretofore not been given to this factor in flowmeter circuit arrangements to correct for fluctuations in excitation current or to produce a constant magnetic field independent of these temperature effects.

Thus even when the excitation coil of a flowmeter is supplied with direct-current pulses which are maintained constant, the resultant magnetic field strength, despite this expedient, is still not constant; for it is dependent on the temperature of the core.

SUMMARY OF INVENTION

In view of the foregoing, the main object of this invention is to provide an electromagnetic flowmeter whose electromagnet core has a permeability that is temperature-dependent and which includes compensation means to render the output signal independent of such temperature effects, whereby the signal accurately reflects the flow rate of the fluid being metered.

More particularly, an object of the invention is to provide a sensor in thermal contact with the core to develop a correction voltage that is temperature-dependent, the correction voltage serving to govern the excitation current supplied to the electromagnet coil to maintain constant the magnetic field strength, or serving to modify the signal voltage yielded by the flowmeter electrodes to correct for the effects of temperature thereon.

OUTLINE OF DRAWINGS

For a better understanding of the invention as well as other objects and further features thereof, reference is made to the following detailed description to be read in conjunction with the accompanying drawings, wherein:

FIG. 1 is a schematic diagram of a first preferred embodiment of an electromagnetic flowmeter having a temperature-sensitive magnetizable core and including means in accordance with the invention to compensate for the effect of core temperature on the output signal;

FIG. 2 is a schematic diagram of a second embodiment of the invention;

FIG. 3a is a schematic diagram of a third embodiment of the invention; and

FIG. 3b illustrates a circuit associated with the flowmeter shown in FIG. 3a.

In the figures, like components are identified by like reference numerals.

DESCRIPTION OF INVENTION

First Embodiment:

Referring now to FIG. 1, there is shown a first embodiment of a temperature-compensated electromagnetic flowmeter in accordance with the invention, the meter including a flow tube 1 through which the fluid to be metered is conducted. The fluid passing through flow tube 1 intercepts a magnetic field established therein by an electromagnet constituted by a core 3 of magnetizable material having an excitation coil 4 wound thereon, thereby inducing a signal voltage U in the field which is transferred to a pair of electrodes 2 mounted at diametrically-opposed positions on tube 1.

Signal voltage U yielded by electrodes 2 is applied to a suitable converter or measuring circuit to produce an output signal corresponding to the flow rate of the fluid being metered. Excitation coil 4 is supplied by a suitable source S with periodic square wave direct-current pulses 5 to produce a current flow through the coil having an intensity I. Interposed between source 5 and coil 4 is a reference voltage resistor $R_B$. The excitation current flowing through resistor $R_B$ produces a reference voltage $U_B$ that depends on the strength of the magnetic field B.

In practice, reference voltage $U_B$ is applied to one input of a divider (not shown) to whose other input is applied signal voltage U to produce a mean flow signal proportional to the average velocity of the fluid being metered. A signal correction arrangement of this type is well known and is disclosed, for example, in the Torimaru U.S. Pat. No. 4,059,014.

A temperature-sensitive resistor $R\mu$ is placed in thermal contact with core 3 of the electromagnet, this resistor being connected in parallel with reference voltage resistor $R_B$. In the absence of resistor $R\mu$, voltage $U_B$ only provides a reference with respect to the intensity of current I. Because the permeability of core 3 is temperature-dependent, voltage $U_B$ does not constitute a reference with respect to the strength of magnetic field B.

However, because temperature-sensitive resistor $R\mu$ varies in resistance in accordance with the temperature of core 3, it acts to modify the reference voltage developed across reference resistor $R_B$ so that the reference voltage is indicative of the strength of the magnetic field B. Hence by dividing signal voltage U by reference voltage $U_B$, one now obtains an output signal that accurately reflects the flow rate of the fluid being metered and is independent of errors arising from the temperature-dependent characteristics of the magnetizable core 3.

Instead of shunting resistor $R\mu$ across reference resistor $R_B$, one may, as shown in dotted lines, place resistor $R\mu$ across excitation coil 4 so as to modify the current passing through this coil. In this way, the magnetic field B established in the flow tube is maintained at a constant strength without regard to the effect of temperature on the permability of core 3, whereby signal voltage U is accurately proportional to the flow rate of the fluid being metered.

Second Embodiment:

In this arrangement, as shown in FIG. 2, associated with the electromagnet of the flowmeter is a measuring coil 6 which is crossed by the lines of flux of magnetic field B, thereby inducing in coil 6 a reference voltage $U_B$ corresponding to the strength of this field.

Excitation coil 4 is supplied with direct-current pulses 7 having inclined leading edges 8. As a consequence, square wave pulses 9 are induced in measuring coil 6, these pulses being produced during the inclined leading edge portions 8 of direct-current pulses 7. These square wave pulses, when time integrated, are indicative of the strength of magnetic field B.

Hence, from the time-integrated measuring voltage $U_B$ derived from measuring coil 6 and from signal voltage U from electrodes 2, one can, in the associated measuring circuit, obtain an output signal that accurately reflects the flow rate of the fluid being metered.

Third Embodiment:

In this arrangement, as shown in FIG. 3a, a first Hall-effect probe $R_{F1}$, which generates a voltage proportional to magnetic field strength, is positioned in thermal contact with magnetizable core 3 and within the magnetic field established by this core. A second Hall-effect probe $R_{F2}$, also in thermal contact with the core, is placed outside this magnetic field.

The two Hall-effect probes $R_{F1}$ and $R_{F2}$, in combination with resistors $R_1$ and $R_2$, as shown in FIG. 3b, are arranged in a bridge circuit 10 across whose input diagonals is applied an input voltage $U_V$. Yielded at the output diagonals of this bridge is a voltage $U_B$, which is exactly proportional to the strength of the magnetic field B and is independent of the effect of temperature on the permeability of core 3.

Here again, as in FIG. 1, coil 4 is supplied with square wave pulses of constant intensity 1. The two Hall-effect probes $R_{F1}$ and $R_{F2}$ must, of course, have the same temperature-dependent characteristics, so that the effects of temperature to which both probes are subjected cancel out in the bridge, whereas the effect of the magnetic field to which only probe $R_{F1}$ is subjected, is not cancelled out.

While there have been shown and described preferred embodiments of a temperature-compensated electromagnetic flowmeter in accordance with the invention, it will be appreciated that many changes and modifications may be made therein without, however, departing from the essential spirit thereof.

We claim:

1. A temperature-compensated electromagnetic flowmeter comprising:

A. a flow tube through which the fluid to be metered is conducted;

B. a pair of diametrically-opposed electrodes mounted on said tube;

C. an electromagnet establishing a magnetic field in said tube to be intercepted by the fluid passing therethrough to induce a signal voltage in said electrodes, said electromagnet being constituted by a magnetizable core having a coil wound thereon to which is applied periodic direct-current pulses to cause an excitation current to flow through said coil, the permeability of said core being temperature-dependent whereby the signal voltage yielded by said electrodes which is dependent on the strength of said magnetic field and is a function of the flow rate of said fluid is subject to a temperature-dependent error; and D. compensation means responsive to changes in the temperature in the core of the electromagnet to render said signal independent of said error to produce an output signal that accurately reflects said flow rate, said compensation means including a reference resistor connected in series with said coil to produce a reference voltage that varies in accordance with the intensity of said excitation current to effect correction of said signal voltage, and a temperature-dependent resistor in thermal contact with said core and in shunt relation with said reference resistor to modify said reference voltage to compensate for the effect of temperature on said core.

2. A temperature-compensated electromagnetic flowmeter comprising:

A. a flow tube through which the fluid to be metered is conducted;

B. a pair of diametrically-opposed electrodes mounted on said tube;

C. an electromagnet establishing a magnetic field in said tube to be intercepted by the fluid passing therethrough to induce a signal voltage in said electrodes, said electromagnet being constituted by a magnetizable core having a coil wound thereon to which is applied periodic direct-current pulses to cause an excitation current to flow through said coil, the permeability of said core being temperature-dependent whereby the signal voltage yielded by said electrodes which is dependent on the strength of said magnetic field and is a function of the flow rate of said fluid is subject to a temperature-dependent error; and D. compensation means responsive to changes in the temperature in the core of the electromagnet to render said signal independent of said error to produce an output signal that accurately reflects said flow rate, said compensation means including a temperature-dependent resistor in thermal contact with said core and in shunt relation with said coil to maintain the excitation current at a level producing a constant magnetic field despite changes in core temperature.

* * * * *